US011122052B2

(12) United States Patent
Zamora Duran et al.

(10) Patent No.: US 11,122,052 B2
(45) Date of Patent: Sep. 14, 2021

(54) SENSITIVE INFORMATION ACCESSIBILITY IN BLOCKCHAIN

(71) Applicant: INTERNATIONAL BUSINESS MACHINES CORPORATION, Armonk, NY (US)

(72) Inventors: Edgar A. Zamora Duran, Heredia (CR); Franz F. Liebinger Portela, Heredia (CR); Ryan G. DeJana, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 15/992,649

(22) Filed: May 30, 2018

(65) Prior Publication Data

US 2019/0372985 A1    Dec. 5, 2019

(51) Int. Cl.
*H04L 29/06*    (2006.01)

(52) U.S. Cl.
CPC .................. *H04L 63/105* (2013.01)

(58) Field of Classification Search
CPC ............ H04L 2209/38; H04L 2209/42; H04L 63/105; H04L 63/123; H04L 9/3239
See application file for complete search history.

(56) References Cited

U.S. PATENT DOCUMENTS

| 10,193,696 | B2* | 1/2019 | Struttmann | G06F 21/602 |
| 10,341,105 | B2* | 7/2019 | Innes | G06F 16/25 |
| 10,482,533 | B2* | 11/2019 | Leonard | H04L 9/088 |
| 10,701,054 | B2* | 6/2020 | Padmanabhan | H04L 9/3236 |
| 10,762,506 | B1* | 9/2020 | Cash | G06K 9/00087 |
| 2014/0283089 | A1* | 9/2014 | Arya | G06F 21/60 726/26 |
| 2015/0244690 | A1* | 8/2015 | Mossbarger | H04L 9/006 713/171 |
| 2016/0217532 | A1 | 7/2016 | Slavin | |
| 2016/0224949 | A1* | 8/2016 | Thomas | G06Q 20/027 |

(Continued)

FOREIGN PATENT DOCUMENTS

| CN | 105610578 A | 5/2016 |
| CN | 106230851 A | 12/2016 |

OTHER PUBLICATIONS

Search Query Report from IP.com (performed Aug. 5, 2020) (Year: 2020).*

(Continued)

*Primary Examiner* — Sharon S Lynch
(74) *Attorney, Agent, or Firm* — L. Jeffrey Kelly

(57) ABSTRACT

A method, computer system, and a computer program product for accessing data in a network is provided. The present invention may include reading a control blockchain, by a non-trusted node, to enable the non-trusted node to read an asset from a trusted node blockchain on a trusted node. The present invention may also include reading the trusted node blockchain by the non-trusted node. The present invention may then include creating, by the non-trusted node, a new block on a temporary blockchain based on the read trusted node blockchain. The present invention may further include transmitting, by the non-trusted node, the created new block to the trusted node, wherein transmitting the created new block causes the created new block to be added to the trusted node blockchain.

15 Claims, 7 Drawing Sheets

(56) References Cited

U.S. PATENT DOCUMENTS

| | | | | |
|---|---|---|---|---|
| 2016/0321654 | A1* | 11/2016 | Lesavich | G06F 16/9554 |
| 2016/0342989 | A1 | 11/2016 | Davis | |
| 2017/0031676 | A1* | 2/2017 | Cecchetti | H04L 9/3236 |
| 2017/0163733 | A1* | 6/2017 | Grefen | H04L 67/20 |
| 2017/0177898 | A1* | 6/2017 | Dillenberger | H04L 9/3236 |
| 2017/0243193 | A1* | 8/2017 | Manian | G06Q 20/065 |
| 2017/0244721 | A1* | 8/2017 | Kurian | H04L 63/105 |
| 2018/0205552 | A1* | 7/2018 | Struttmann | G06F 16/9024 |
| 2018/0343114 | A1* | 11/2018 | Ben-Ari | G06F 21/64 |
| 2018/0359089 | A1* | 12/2018 | Innes | G06F 16/182 |
| 2019/0013932 | A1* | 1/2019 | Maino | G06F 9/451 |
| 2019/0013933 | A1* | 1/2019 | Mercuri | G06F 16/212 |
| 2019/0013948 | A1* | 1/2019 | Mercuri | H04L 9/0643 |
| 2019/0044976 | A1* | 2/2019 | Smith | H04L 63/10 |
| 2019/0052454 | A1* | 2/2019 | Wright | H04L 9/0861 |
| 2019/0122186 | A1* | 4/2019 | Kano | G06Q 20/065 |
| 2019/0197534 | A1* | 6/2019 | Alastair | G06Q 20/38215 |
| 2019/0236316 | A1* | 8/2019 | Watkins | G06F 16/152 |
| 2019/0236562 | A1* | 8/2019 | Padmanabhan | H04L 9/3239 |
| 2019/0243572 | A1* | 8/2019 | Kursun | G06F 3/0632 |
| 2019/0279210 | A1* | 9/2019 | Pen | H04L 9/0637 |
| 2019/0305938 | A1* | 10/2019 | Sandberg-Maitland | H04L 9/321 |
| 2019/0327079 | A1* | 10/2019 | Nandakumar | H04L 9/3231 |
| 2019/0327090 | A1* | 10/2019 | Innes | H04L 9/3239 |
| 2019/0349371 | A1* | 11/2019 | Smith | H04L 9/3239 |
| 2019/0349372 | A1* | 11/2019 | Smith | H04L 9/3265 |
| 2019/0373472 | A1* | 12/2019 | Smith | H04L 41/08 |
| 2019/0385229 | A1* | 12/2019 | Leonard | H04L 9/0637 |
| 2020/0021589 | A1* | 1/2020 | Smith | H04L 9/3239 |
| 2020/0111158 | A1* | 4/2020 | Collins | G06Q 20/108 |
| 2020/0169546 | A1* | 5/2020 | Padmanabhan | H04L 63/101 |
| 2020/0280443 | A1* | 9/2020 | Simons | H04L 63/12 |
| 2021/0064780 | A1* | 3/2021 | Riedel | G06Q 20/3674 |
| 2021/0067511 | A1* | 3/2021 | Smith | H04L 63/0823 |

OTHER PUBLICATIONS

Search Query Report from IP.com (performed Feb. 5, 2021) (Year: 2021).*
Search Report from IP.com (performed Jul. 9, 2021) (Year: 2021).*
Azaria et al., "MedRec: Using Blockchain for Medical Data Access and Permission Management", 2016, pp. 25-30, 2016 2nd International Conference on Open and Big Data, IEEE Computer Society.
Bitcoin Magazine, "Modeling the Blockchain For Business Use", Jan. 22, 2016, 3 Pages, BTC.Com, https://bitcoinmagazine.com/articles/modeling-the-blockchain-for-business-use-1453487323/, 5 pages.
Jenn, "Using Blockchain Technology for Secure Data Encryption", Jul. 23, 15, 5 Pages, BTC.com, https://www.newsbtc.com/2015/07/23/using-blockchain-technology-for-secure-data-encryption/, 8 pages.
Leon, "The Case for Smart Bankers: A Federated and OPEN Interbanking Blockchain.", Nov. 1, 2015, 9 pages, Medium.com, https://medium.com/@gubatron/the-case-for-smart-bankers-a-federated-and-open-interbanking-blockchain-8add3119ad9c.
Prasad, "Protecting Sensitive Data by Utilizing Blockchain—Distributed Leader Technology.", Printed on May 24, 2018, 9 Pages, Academia.edu, http://www.academia.edu/24490920/Protecting_Sensitive_Data_by_utilizing_Block_chain_-Distributed_Leader_Technology, 9 pages.
Zyskind et al., "Decentralizing Privacy: Using Blockchain to Protect Personal Data", May 21, 2015-May 22, 2015, 2015 Security and Privacy Workshops (SPW), 2015 IEEE, 5 Pages, IEEE Computer Society.
Mell et al., "The NIST Definition of Cloud Computing", National Institute of Standards and Technology, Special Publication 800-145, Sep. 2011, pp. 1-7.
Monegro, "The Blockchain Application Stack", https://www.coindesk.com/blockchain-application-stack//, Dec. 2, 2014, pp. 1-3.
Back et al., "Enabling Blockchain Innovations with Pegged Sidechains", Oct. 22, 2014, pp. 1-25.

* cited by examiner

US 11,122,052 B2

SENSITIVE INFORMATION ACCESSIBILITY IN BLOCKCHAIN

BACKGROUND

The present invention relates generally to the field of computing, and more particularly to information access. Open source software projects can advance blockchain technology by enabling various businesses and industries to identify and use blockchain technology features. Some challenges related to the advancement of blockchain technology may include accessibility to a blockchain and controlling sensitive personal information (SPI).

SUMMARY

Embodiments of the present invention disclose a method, computer system, and a computer program product for accessing data in a network. The present invention may include reading a control blockchain, by a non-trusted node, to enable the non-trusted node to read an asset from a trusted node blockchain on a trusted node. The present invention may also include reading the trusted node blockchain by the non-trusted node. The present invention may then include creating, by the non-trusted node, a new block on a temporary blockchain based on the read trusted node blockchain. The present invention may further include transmitting, by the non-trusted node, the created new block to the trusted node, wherein transmitting the created new block causes the created new block to be added to the trusted node blockchain.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
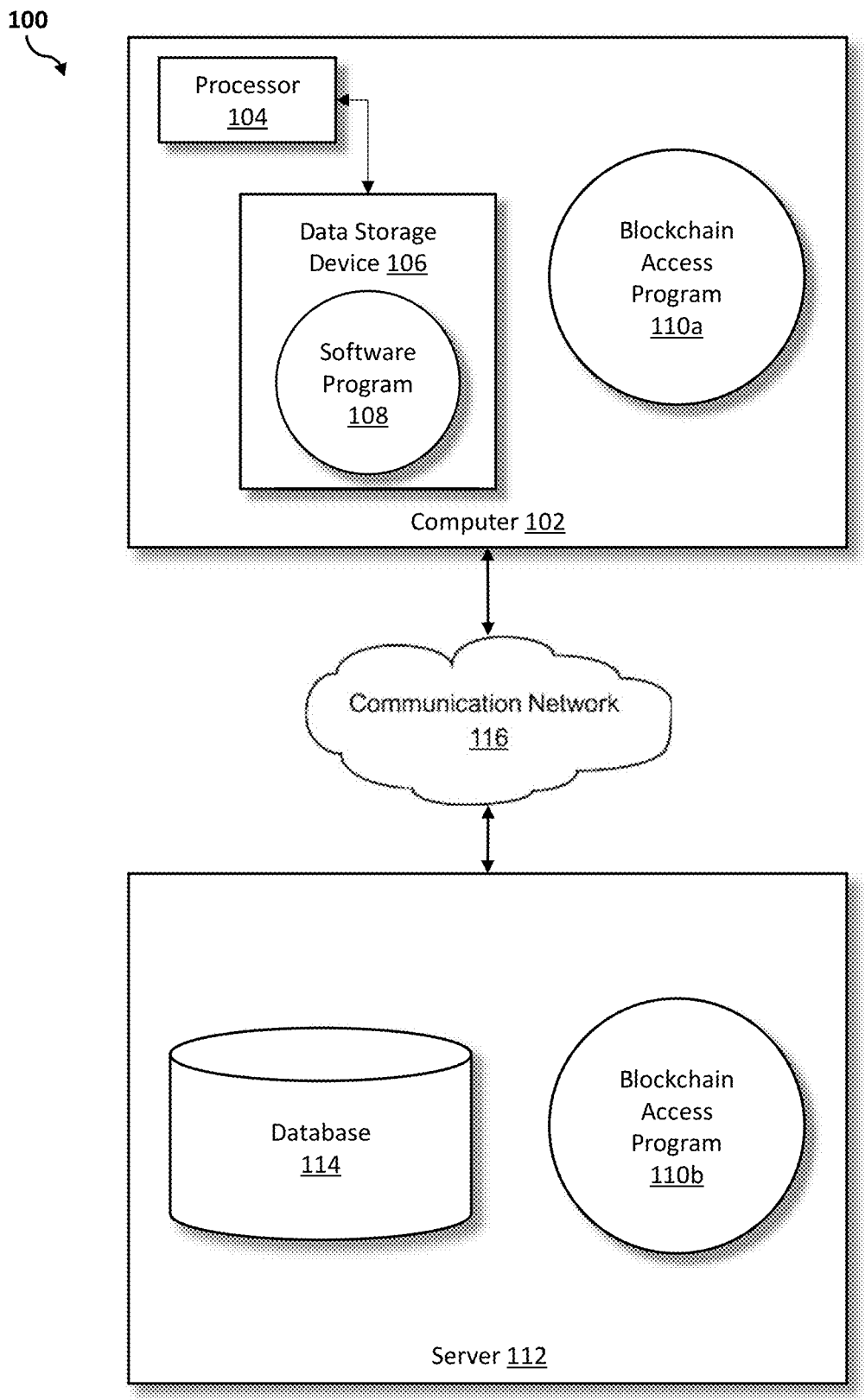
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for access to blockchain data. As such, the present embodiment has the capacity to improve the technical field of blockchain access by allowing temporary controlled access to data in a block. More specifically, temporary regional access to SPI data stored in a block is allowed with approval from a user by allowing a controller node to allow one trusted node to share data from a block in a blockchain to a second node, temporarily. The user chooses the amount of time access may be granted.

As previously described, open source software projects can advance blockchain technology by enabling various businesses and industries to identify and use blockchain technology features. Some challenges related to the advancement of blockchain technology may include accessibility to a blockchain and controlling sensitive personal information (SPI).

Hyperledger is an open source project to leverage blockchain technology. Hyperledger is a collaboration between many industry leaders to use blockchain technology for various businesses or industries. Blockchain technology may be used for a network system to have consensus, authenticity, immutability and finality of the logged events. Hyperledger may use various software developing resources to create platforms that may support blockchain technology. Additionally, smart contracts may be used in the network system and may allow particular permissions to access, write to or control the flow of data.

Blockchain technology may include a shared log of events that are kept in blocks of data that may be passed to the next transaction in a linear order. A block may contain the data of one or more records or transactions. A block may hold the data before the block has been completed, prior to consensus and prior to being transferred to the next block in a blockchain, for example, a transaction pool, a memory pool or a candidate block. A block may also be a block of one or more records or transactions attached to a blockchain, for example, a transaction that has been permanently appended and recorded to the files in a blockchain.

With blockchain technology, for example, when a transaction is written into a ledger, there may be a mechanism to make sure all the records are synchronized and if the network system detects an error, the error may be immediately corrected. Blockchain systems are immutable since, for example, a hash value on each block may be created and any change in data will show a different hash value. Each block may contain the hash of the previous block and the current transactions before the next hash may be created. After consensus is reached, then the data may be verified. Each block may have a hash value of the previous block in the chain and there may be no way to modify the data in the previous block. If the data is modified, the modified data may be detected by a re-calculated hash value. A different hash value may show that the network system has been compromised.

One challenge related to blockchain may include how to control sensitive personal information (SPI) contained in a block. One other challenge may include how to manage access to a block managed at other locations over a period of time. Therefore, it may be advantageous to, among other things, provide regional access and temporal access to a blockchain from one trusted node to a secondary node in another network by managing the nodes networks associations in a hierarchy using a controller node. Regional and temporal access to data may leverage blockchain to offer data protection.

According to at least one embodiment, regional access and temporal access to one blockchain or more than one blockchains between a trusted node in one network and a secondary node (i.e., a non-trusted node) in another network may be managed by a controller node. A controller node may manage a node network association and a complex hierarchy among various nodes and various node networks. A controller node may also manage access to SPI on a blockchain by separating the SPI in a local network repository (i.e., database, corpus or knowledgebase) which may be accessed by a secured service that requires a user authorization before the database may be queried.

Regional access and temporal access to a blockchain may include a network system with various components communicating via a communication network. One component of the network system may include a hierarchy of nodes, a control blockchain, a set of controller nodes (i.e., public controller nodes), local network SPI repositories and secure local services that may access the SPI repositories. Additionally, a process may be used that allows a trusted primary node to share the content of the trusted primary node blockchain to a secondary node that belongs to a different network. The content may be shared temporarily. Another process may be used for a trusted secondary node to create a block to the local blockchain of the secondary node and then the secondary node may send instructions to the trusted primary node to create the block in the original primary node blockchain. An additional process may include a node accessing SPI related to a block.

A blockchain access program may work with the network system and the various components to allow temporary regional access to a block in a blockchain. The blockchain access program may control access to data in blockchains by region and by timeframe. The blockchain access program may also separate or parse sensitive personal data out of public data in a block. Additionally, complete records of data may be stored on a trusted node repository and the stored data may be traceable. A central node may control access to a blockchain while remaining compliant with regulations for managing privileged information for a blockchain system by using secured services and access authentication from the information owner (i.e., the user or the owner).

For example, a user may reside in Country A and travel to Country B for a month. Both countries may manage and store patient files in blockchains in a medical center database that contains SPI. The user (i.e., the patient or the owner of the medical record) would prefer the medical records to be made available to Country B for the duration of the visit, one month, in case the user needs to visit a hospital in Country B.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a blockchain access program 110a. The networked computer environment 100 may also include a server 112 that is enabled to run a blockchain access program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communication network 116. The communication network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the blockchain access program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the blockchain access program 110a, 110b (respectively) to control the accessibility to data in a block and the amount of time the data may be accessible to a trusted node. The blockchain access method is explained in more detail below with respect to FIGS. 2-5.

Figure 2:
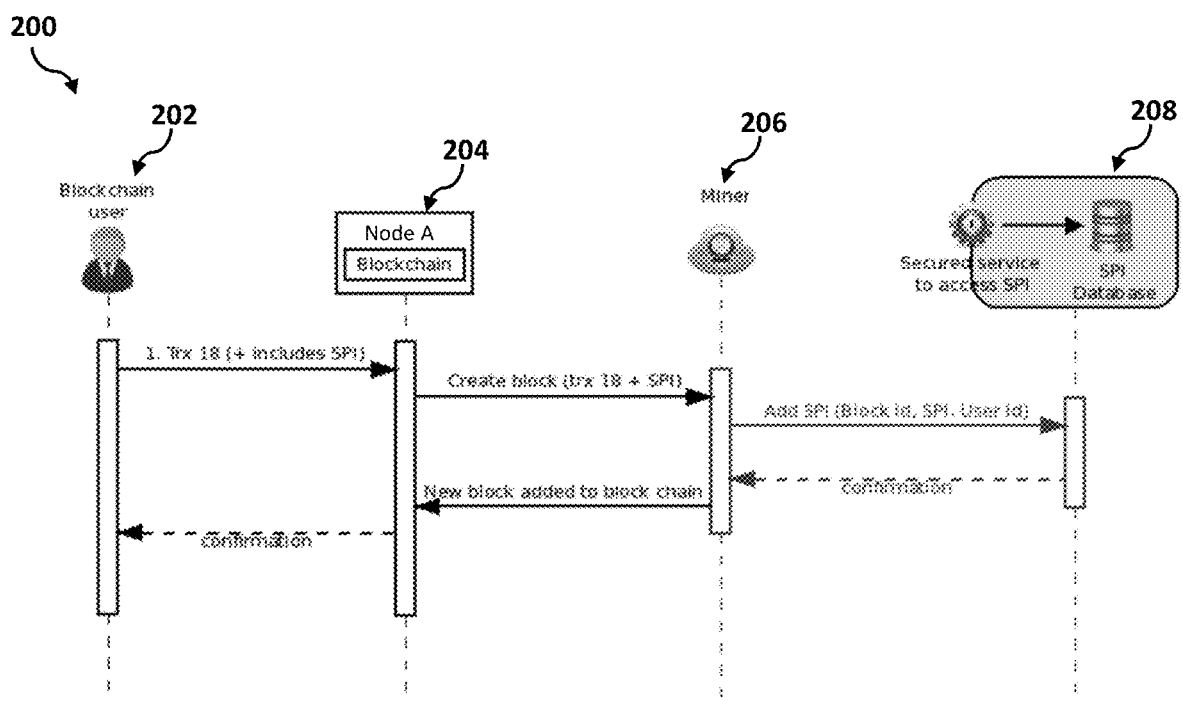
FIG. 2 is an example of a block diagram showing the creation of a block containing sensitive personal information (SPI) according to at least one embodiment.

Referring now to FIG. 2, an example of a block diagram illustrating the exemplary block creation containing SPI process 200 used by the blockchain access program 110a, 110b according to at least one embodiment is depicted. The block creation containing SPI process 200 may include a Blockchain user 202, a Node A 204, a Miner 206 and an SPI Database 208 communicating via a communication network (e.g., communication network 116). The blockchain user 202 may transmit information (i.e., data) to Node A 204, which may store blockchain data. The transmitted information may be considered a transaction (trx) written to a block that may become appended to the blockchain once consensus is reached. The transmitted information may include SPI and may be shared with Node A 204.

Node A 204 may create a block based on the blockchain user 202 transaction and transmit the transaction to a Miner 206 (i.e., miner node). The miner 206 may include a miner node nested at various network levels. The miner 206 may have limited power, such as the ability to create a block using a transaction, reorder a transaction, remove a transaction or translate a blockchain from one node to a different node. The miner 206 may not, for example, provide consensus to create a blockchain from a list of transactions. The miner node may expend computing power to allow a node to be at one or more hierarchy levels simultaneously. A blockchain access program may use a non-centralized federation (i.e., decentralized network) based on compute power to allow a node to operate at one or more hierarchy levels simultaneously.

Sidechain multiple signature accounts may be implemented at each level to allow, for example, a blockchain user 202 to pass information from a local network to a regional network. A signature of a target network may be required to make a federation with sidechains to allow assets (e.g., tokens, digital assets or SPI) to be securely moved among blockchains. A sidechain may handle unique functions, such as a function that may require large processing power or a different function may require a large number of transactions. A sidechain, for example, at each local area network will trust the blockchains in that particular local area network.

One distinction between a sidechain node and a node may be a node may have to subscribe in each network the node aims to access. A node may operate at different network levels by registering with the control node for access. Each network may have a complexity number or a parameter of the required computations for the ability to interact with the target network. The controller node may provide the complexity number to the node for the ability to access and interact with the target network or the subscribed networks. Complexity number sharing may assist in federating the interaction between networks, which is done in each network at run time.

The miner 206 may transmit a created block to a SPI database 208. The SPI database 208 may require a secured service to access the SPI database 208, for example, may require a user ID to add the SPI from blockchain user 202 to the SPI database 208. The SPI database 208 may then send a confirmation back to the miner 206 and the miner 206 may add the new block to a blockchain at Node A 204. Then a confirmation may be sent from Node A 204 to the blockchain user 202.

Figure 3:
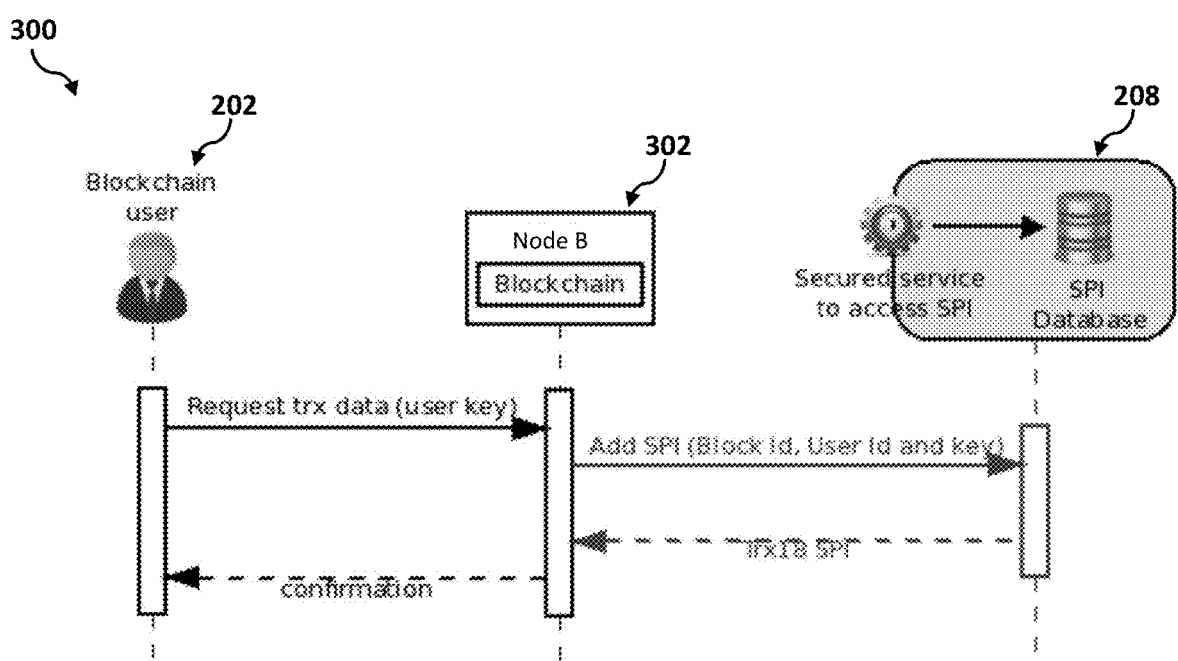
FIG. 3 is an example of a block diagram showing the retrieval of SPI data according to at least one embodiment.

Referring now to FIG. 3, an example of a block diagram illustrating the exemplary retrieval of SPI data process 300 used by the blockchain access program 110a, 110b according to at least one embodiment is depicted. The retrieval of SPI data process 300 may include the blockchain user 202, a Node B 302 and the SPI database 208. The blockchain user 202 may initiate a request at Node B 302 to access and update SPI in the SPI database 208. Accessing and updating may include reading or writing to the SPI database from Node B 302.

The blockchain user 202 may initiate a request to access the SPI database from Node B 302 via a communication network 116 by entering a user key, a username, access code, password, passkey, biometric features (e.g., retina scan, fingerprint scan or facial recognition) or other identification measures and procedures required for access. The SPI database may, for example, securely store encrypted or unencrypted medical records or financial records for the blockchain user 202. Node B 302 may be a node that resides in a different location and a different network than Node A 204 and the SPI database 208. For example, the blockchain user 202 lives in the United States, Node A 204 and the SPI database is also located the United States and Node B is in Sweden, where the Blockchain 202 is traveling to and will need access to the SPI stored in the SPI database 208. Within each country, there may be more hierarchy levels of accessibility, such as by region, state or city.

Node B 302 may access, read and write to a block in the SPI database 208 after receiving the blockchain user 202 request and approval (e.g., entering username and password on a medical affiliation website). Node B 302 may add, for example, SPI to the SPI database 208 based on the blockchain user 202 identification (ID) and key or identification measures needed to access and write to the SPI database 208. An example of a new block added to the blockchain on Node A 204, is as follows.

| Block |
|---|
| Block Header: |
| Block hash (Block ID)<br>Previous Block ID<br>Transaction Hash<br>Number of Transactions<br>Transaction List: |
| Trx 1<br>Trx 5<br>Trx 10<br>* Trx 18-SPI Marked |

SPI marked data may be, for example, one transaction among many other SPI and non-SPI marked transactions in a block. The SPI marked data may require approval from a secured service, for example, by requiring the blockchain user 202 to provide identification through a username and password or through a biometric analysis before the SPI marked data may be read on the SPI database 208 or transmitted to a different, secondary node.

Figure 4:
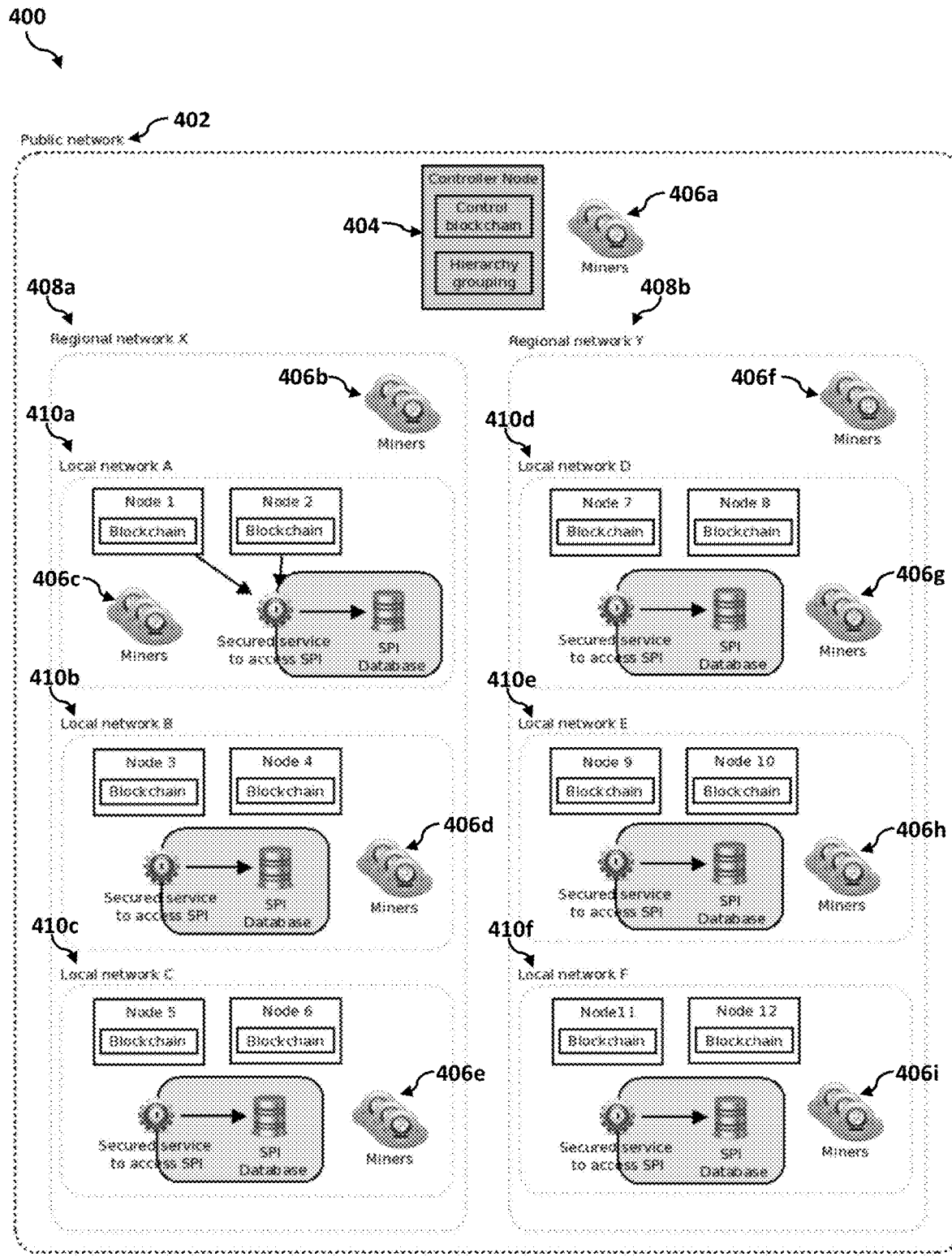
FIG. 4 is an example of a block diagram of the blockchain access system according to at least one embodiment.

Referring now to FIG. 4, an example of a block diagram illustrating the exemplary blockchain access system 400 used by the blockchain access program 110a, 110b according to at least one embodiment is depicted. The blockchain access system 400 may operate within a public network 402 and include a Controller Node 404, Miners 406a-i, Regional Network X 408a and Regional Network Y 408b (i.e., regional networks 408a-b) and Local Network A 410a, Local Network B 410b, Local Network C 410c, Local Network D 410d, Local Network E 410e, and Local Network F 410f (i.e., local networks 410a-f). Each regional network, for example, regional networks 408a-b, may include one or more miners (e.g., 406b, f) and one or more local networks (e.g., local networks 410a-f). Each local network, for example, local networks 410a-f, may include one or more nodes that may use blockchain technology (e.g., nodes 1-12, blockchain nodes or blockchain nodes 1-12), one or more miners (e.g., miners 406c-e and 406g-i) and one or more local network SPI databases (e.g., local network A-F 410a-f SPI databases).

A public network 402 may include a network that the general public may gain access and connect to, for example, the internet and access to the internet through an internet service provider. The public network 402 may allow the public to connect to other networks, for example, a network in a different city, state or country.

A controller node 404 may exist in the public network 402 and may be accessible for each node in any level of any hierarchy. The controller node 404 may contain data regarding the hierarchy grouping. A single node may be related to one or more levels of hierarchy, for example, local network A 410a Node 1 exists at a local level (e.g., local network A 410a), a regional level (e.g., regional network X 408a) and a public level (e.g., public network 402) (i.e., 3 levels of hierarchy). The controller node 404 may also manage the blockchain and control the blockchain access (e.g., access to read, write and edit permissions). The miners 406a-i may perform the same functions as miner 206.

The presented blockchain access system 400 example depicts 3 levels of hierarchy, however, alternate embodiments may provide fewer levels or more levels of hierarchy than provided in the present example. Hierarchies may include, for example, nodes located at different levels of accessibility or nodes in different regions geographically. The number of node levels (i.e., n-levels of hierarchy) may vary based on different implementations, however, the blockchain access system 400 example presents nodes at a local level, a regional level and a public level. A node in a local network (e.g., local network A 410a Node 1) may share the Node 1 blockchain with the controller node 404 by default. Each node level may have varying levels of complexity (i.e., difficulty) to ensure the times for blocks insertions by miners 406a-i remain as similar as possible.

Varying levels of complexity may rely on the difficulty in finding a new block, which may be based on hashing power in use by miners 406a-i. Difficulty may be a measure described as a number and the higher the number, the higher the difficulty in finding a hash below a given target. A given target may require a hash below a specified target. For example, a smaller local network A 410a may have a difficulty of 400,000 and a larger regional network X 408a may have a difficulty of 400,000,000. The larger difficulty may imply that local network A 410a Node 1 may have to use the larger difficulty (i.e., 400,000,000) at the time of operating in the regional network X 408a blockchain if local network A 410a obtains membership to regional network X 408a. In this example, local network A 410a Node 1 would create a block in both networks (i.e., local network A 410a and regional network X 408a) so that the equivalence of complexity is kept in the controller node for local network A 410a Node 1 to check.

The n-levels of hierarchy may represent, for example, the breath of geographical coverage created going from bottom-up (i.e., state/province, country, region and public). Miners 406a-i may be registered at one level or more than one level of hierarchies to represent belonging. Miners 406a-i (i.e., miner nodes) may include miner nodes that create blocks and may be the specific miner nodes that use the complexity number. A distinction between a miner (e.g., miners 406a-i) node and a network node (e.g., local network A 410a Node 1) may include the miner node utilizing the complexity number, however, may not hold or store the data like a network node. A miner node may be added to one or more networks (e.g., local networks A-F 410a-f) as long as the miner node is allowed without restrictions. A network node (i.e., a full node that contains the stored blockchain) may select which miner node to use and at which network level that may pass the complexity number parameter.

Nodes in a local network (e.g., local networks A-F 410a-f) in which a blockchain was initiated may be called trusted nodes. Blockchain initiation may include where the genesis block was created. For example, blockchain user 202 resides in local network A, medical records were stored on local network A 410a SPI database and the medical records were stored in the local network A 410a Node 1 blockchain. Therefore, local network A 410a Node 1 may be a trusted node for the medical data of the blockchain user 202 and the local network A 410a Node 1 blockchain is the genesis block. Further, Miners 406c may be trusted miners or a trusted miner node for local network A410a Node 1.

A trusted miner node (e.g., miners 406c) may allow a read function to a blockchain from an authorized secondary miner (e.g., miners 406g). The trusted miner node may become, by default, the trusted miner node for the node that initially created the blockchain (e.g., local network A 410a Node 1). The read function allowed from a trusted miner to a secondary miner may be allowed via the controller node 404 by using the control chain provided by the controller node 404. The control chain may be a blockchain that is accessible for nodes that contain pairs of complexity numbers to be used in the creation of a block for the blockchain between networks. For example, local network A 410a Node 1 may obtain current complexity values pairs from the control node 404 for two networks by requesting to create a node to miners in local network A 410a and regional network X 408a.

Additionally, the control chain provided by the controller 404 may, for example, be used to copy new blocks of data created by the secondary miners (e.g., miners 406g) that are stored on a temporary blockchain (i.e., temporal blockchain) on the non-genesis block (e.g., a local network D 410d temporal blockchain) the trusted node, trusted network or trusted miner node (e.g., local network A 410a Node 1 blockchain).

The controller node 404 may include a control blockchain and a hierarchy grouping. The control blockchain may include a list of complexity pairs between a hierarchy level and the public level, for example local network A 401a with a complexity of 400,000 and regional network X 408a with a complexity of 400,000,000. A control block in the control blockchain may assist by managing the conversions when a blockchain is shared to a secondary miner node in a different network. For example, the control block may assist the secondary miner node 406g in converting a block from trusted local network A 410a Node 1 blockchain to be readable by local network D 410d Node 7 by obtaining the complexity value pair, previously read from the control chain, from local network A 410a Node 1 for local network local network A 410a and local network D 410d. The hierarchy grouping may include, for example, the list of nodes by each network level.

A control chain example for the public network 402, local networks A-C 410a-c and regional network X 408a may function as follows.

| Control Blockchain | | | |
|---|---|---|---|
| Block 1 | Block 2 | Block 3 | Block 4 |
| Local Network A Complexity = 50% | Local Network B Complexity = 45% | Local Network C Complexity = 55% | Regional Network X Complexity = 70% |
| Public Network Complexity = 90% | Public Network Complexity = 90% | Public Network Complexity = 90% | Public Network Complexity = 90% |

Each local network (e.g., local networks 410a-f) may include secured services and one or more SPI databases (e.g., SPI database 208 or local networks 410a-f secured services and SPI databases). Each local network or the most inner level network (e.g., if there is a network level below local network and using a different formation or an alternate embodiment) may keep the SPI of the owners of the local network blockchain (e.g., local network A 410a Node 1 blockchain) in a corpus, a repository or a database that may be accessible, for example, by a secure application programming interface (API). Each block in the blockchain may store transactional data as, for example the current bitcoin description does, however, the nodes may keep the uniform resource locator (URL) of the mentioned API and access to a block may require the owner (e.g., blockchain user 202) key.

A blockchain access program 110a, 110b example may use the public network 402 to sustain the world medical networks. Individual medical profiles may be stored in blockchains. Local medical networks may store the data of regional habitants (e.g., by country), however, the individual (e.g., blockchain user 202) may choose at which level to keep the data pertaining to the individual's medical profile accessible or available and the individual may also choose the time frame to keep the data accessible or available. The individual may, for example, travel to a different country for one month and may require the individual's blockchain to be shared with hospitals in the destination country for one month while traveling. The controller node (e.g., controller node 404) may keep track of the individual's blockchain and assist miners (e.g., miners 406a-i) in translating a blockchain from one node (e.g., local network A 410a Node 1) to a different node (e.g., local network D 410d Node 7). The SPI related to the traveling individual may remain in one place (e.g., local network A 410a Node 1 blockchain) and may become accessible to a different location (e.g., local network D 410d Node 7) once the individual authorizes access (e.g., username and password or identifying information) to the SPI.

Figure 5:
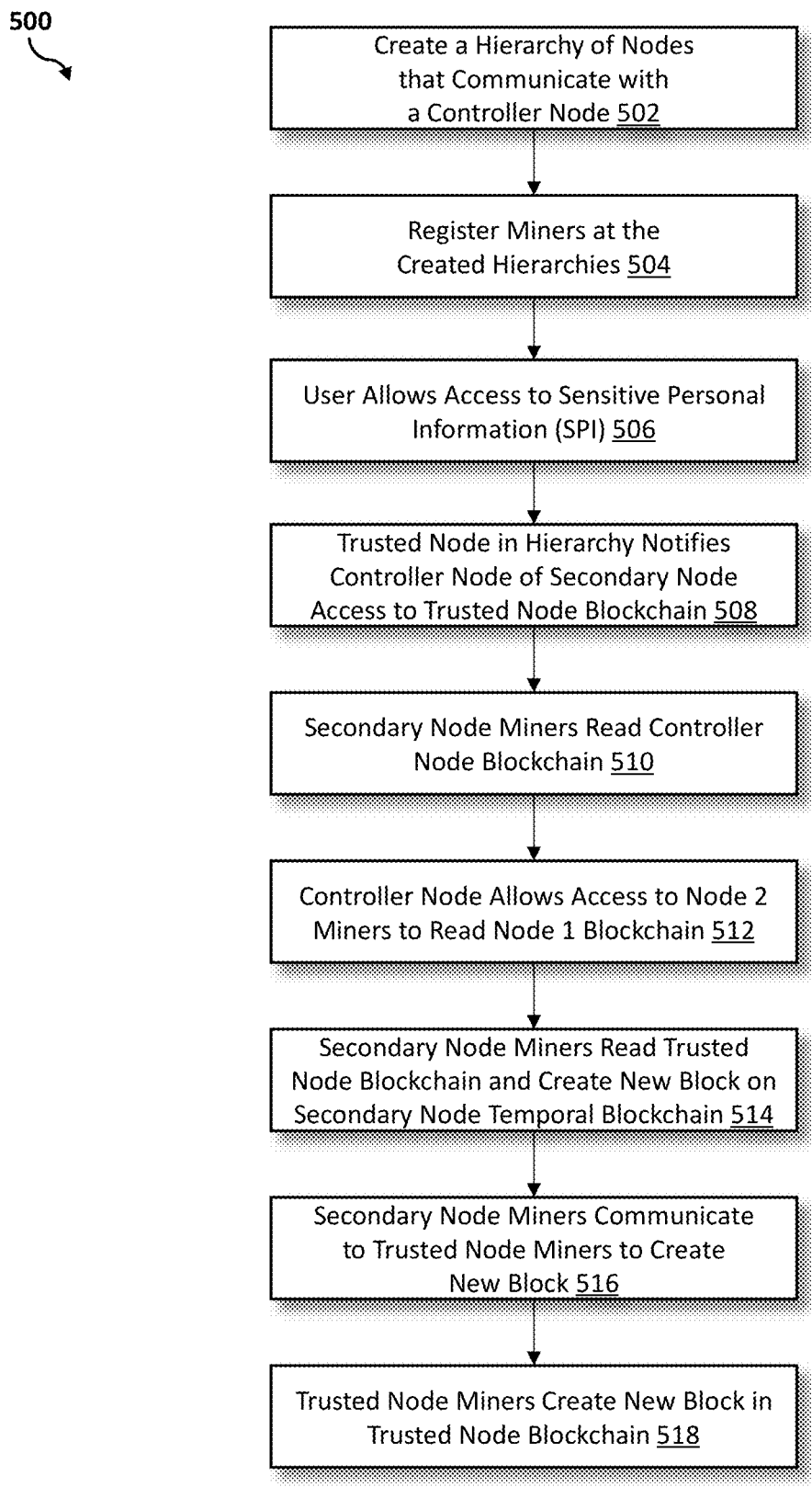
FIG. 5 is an operational flowchart illustrating a blockchain access and retrieval process according to at least one embodiment.

Referring now to FIG. 5, a flowchart illustrating the exemplary blockchain access and retrieval process 500 used by the blockchain access program 110a, 110b according to at least one embodiment is depicted.

At 502, a hierarchy of nodes that communicate with a controller node (e.g., controller node 404) is created. The hierarchy of nodes in a public network (e.g., public network 402) may be created and then further adjusted (i.e., add or remove levels and the number of nodes, SPI databases and miners). One hierarchy (i.e., 2 levels) to multiple hierarchies (i.e., n-levels) may be created. The controller node 404 may communicate via a communication network 116 with all hierarchy levels, for example, hierarchy levels based on geographical locations between two different cities, states or countries. The hierarchy of levels based on geographical locations may, for example, correspond to a local level, a regional level or a public level and each level may contain a node that uses blockchain technology, miners (e.g., miners 406a-i), communication with a secure service to access SPI, an SPI database (e.g., SPI database 208) and a temporal blockchain. The controller node 404 may include a control blockchain component, a hierarchy grouping component and associated miners.

Then, at 504, the miners (e.g., miners 406a-i) at the created hierarchies are registered. The miners may be registered at each hierarchy by adding to the list of miners 406a-i by network level hierarchy. For example, a miner node (e.g., miners 406a-i) can be in the list of miners for local network A 410a and then added temporarily or permanently to regional network X 408a and local network D 410d. Local network A 410A Node 1 (i.e., the trusted node) may request to add miners 406b to local network D 410d (i.e., the secondary node) for a specific period of time since miners 406b are now trusted based on the registration.

Next, at 506, access to SPI is allowed by the user (e.g., blockchain user 202). SPI access to an SPI database may use a secured service for accessibility. A secured service may include, for example, an API interface using simple object access protocol (SOAP) or representational state transfer (REST) with operations to get the restricted data. Access to a secured service may have varying identification requirements for access. For example, an unencrypted user key, an encrypted user key, a username, an access code, a password, a passkey, or biometric features (e.g., retina scan, fingerprint scan or facial recognition).

At 508, the trusted node in the hierarchy notifies the controller node (e.g., controller node 404) that the secondary node may access the trusted node blockchain. The trusted node and the secondary node, for example, may be represented by local network A 401a Node 1 and local network D 410d Node 7, respectively. For example, once access to the SPI is presented by the blockchain user 202, local network A 410a Node 1 will notify the controller node 404 of the approval for local network D 410d Node 7 to access the blockchain user's 202 SPI from the local network A 410a SPI database. Notification regarding accessibility to the trusted node may, for example, be a response to invoking a method intermediated by the controller node 404 that has local network d 410d Node 7 as a caller and local network A 410a Node 1 as a responder. Notifications may be stored in the controller node 404 control blockchain.

The secondary node may seek accessibility to the trusted node blockchain by accessing and reading the control blockchain. Alternatively, the secondary node may receive an accessibility notification from the controller node.

Then, at 510, the secondary node miners read the controller node (e.g., controller node 404 blockchain. The secondary node miners may read the controller node blockchain by accessing the control chain, since the control node is open for all networks nodes by applications able to read the specific data.

For example, miners 406g may read the controller node 404 control blockchain to determine if local network D 410d Node 7 has gained access to local network A 410a Node 1 SPI database via blockchain user 202 approval using a secure service. The miners 406g may, for example, be triggered to read the controller node 404 control blockchain once the blockchain user 202 logs into and confirms identity through a secured service to access an SPI database from a node that is different from the trusted node, such as when the blockchain user 202 requests access when traveling to a different geographical region. If the blockchain user 202 previously gave access or consent for nodes in a network (e.g., local network D 410d Nodes 7-8) to access the blockchain user 202 SPI, then nodes may get or receive a token (i.e., an asset or access to an asset) from the controller node 404 based on the authorization recorded by the blockchain user 202 consent. The blockchain user 202 consent may be recorded in a database for accessibility for the duration of the time allowed for accessibility.

At 512, the controller node allows access to the secondary node miners to read the trusted node blockchain. The controller node 404 may allow the secondary node access to the trusted node blockchain by sending the response to the query, for example, for local network D 410d Node 7 to access local network A 410a Node 1.

Then, at 514, the secondary node miners read the trusted node blockchain and create a new block on the secondary node temporal blockchain. Using the read access to the trusted node blockchain, the secondary node may add data to a new temporal blockchain located at the secondary node. For example, the blockchain user 202 lives in Country A and is traveling to Country B for one month and during the trip, blockchain user 202 needs to visit a hospital. Blockchain user 202 provides accessibility to medical records located in Country A to the hospital in Country B for the rest of the duration of the travel period. Country B hospital will log the treatment that blockchain user 202 received to a block on a temporal blockchain located on a local node in country B (e.g., local network D 410d Node 7 temporal blockchain).

At 516, the secondary node miners communicate to the trusted node miners to create a new block. A signal may include multiple transactions to be included in the new block. Continuing from the previous example, miners 406g will transmit a signal to miners 406c to create a new block in the local network A 410a Node 1 blockchain. The new block data may include or correspond to, for example, information that was obtained from the blockchain user's 202 visit to the hospital in Country B and may be data that was stored on the local network D 410d Node 7 temporal blockchain.

Then, at 518, the trusted node miners create a new block in the trusted node blockchain. A new block may be created by including all block data. From a previous example, see below.

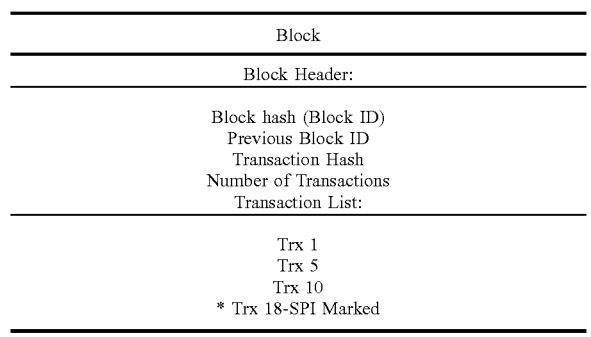

It may be appreciated that FIGS. 2-5 provide only an illustration of one embodiment and do not imply any limitations with regard to how different embodiments may be implemented. Many modifications to the depicted embodiment(s) may be made based on design and implementation requirements.

Figure 6:
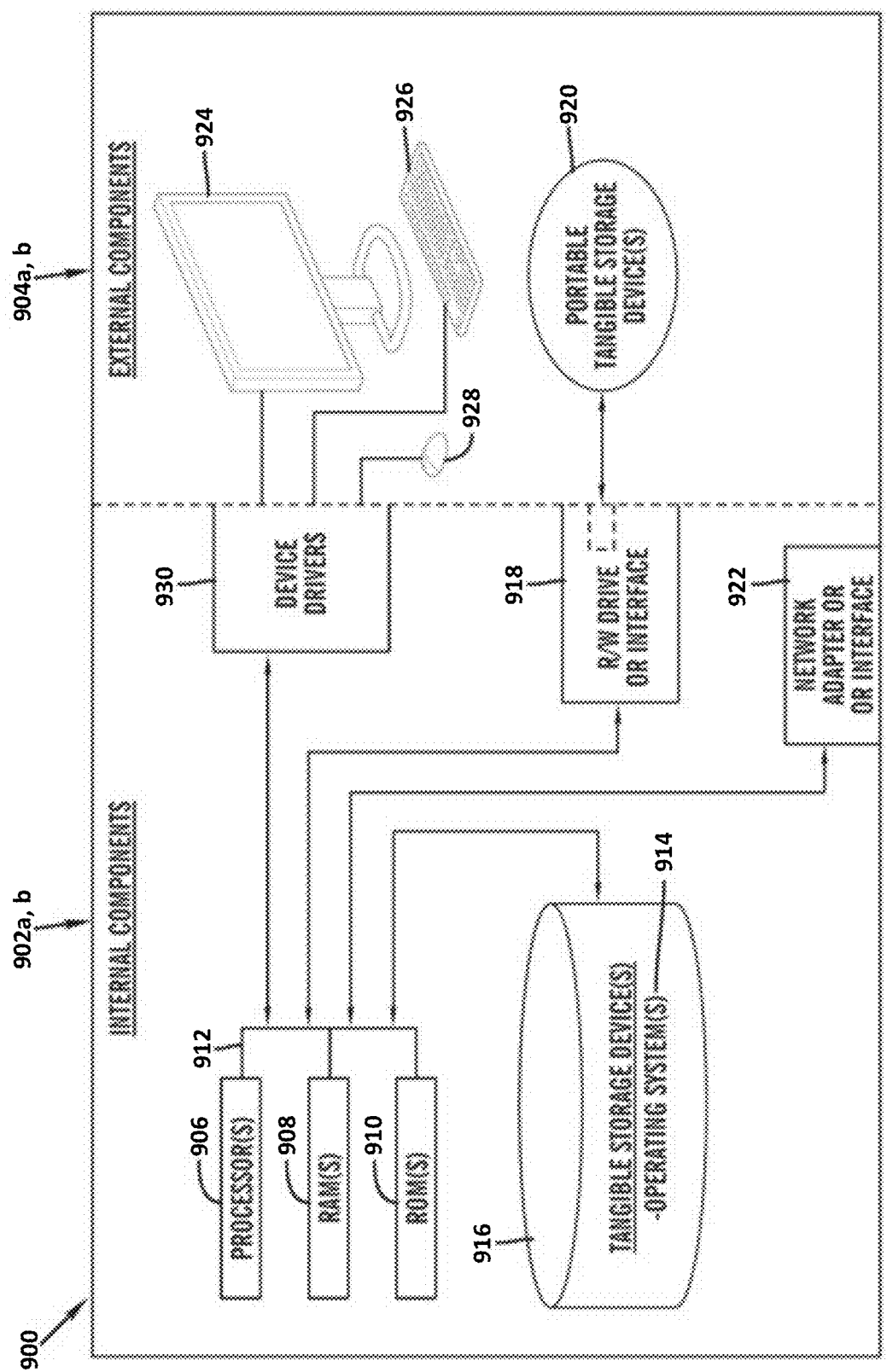
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 6. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the blockchain access program 110a in client computer 102, and the blockchain access program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the blockchain access program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the blockchain access program 110a in client computer 102 and the blockchain access program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the blockchain access program 110a in client computer 102 and the blockchain access program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
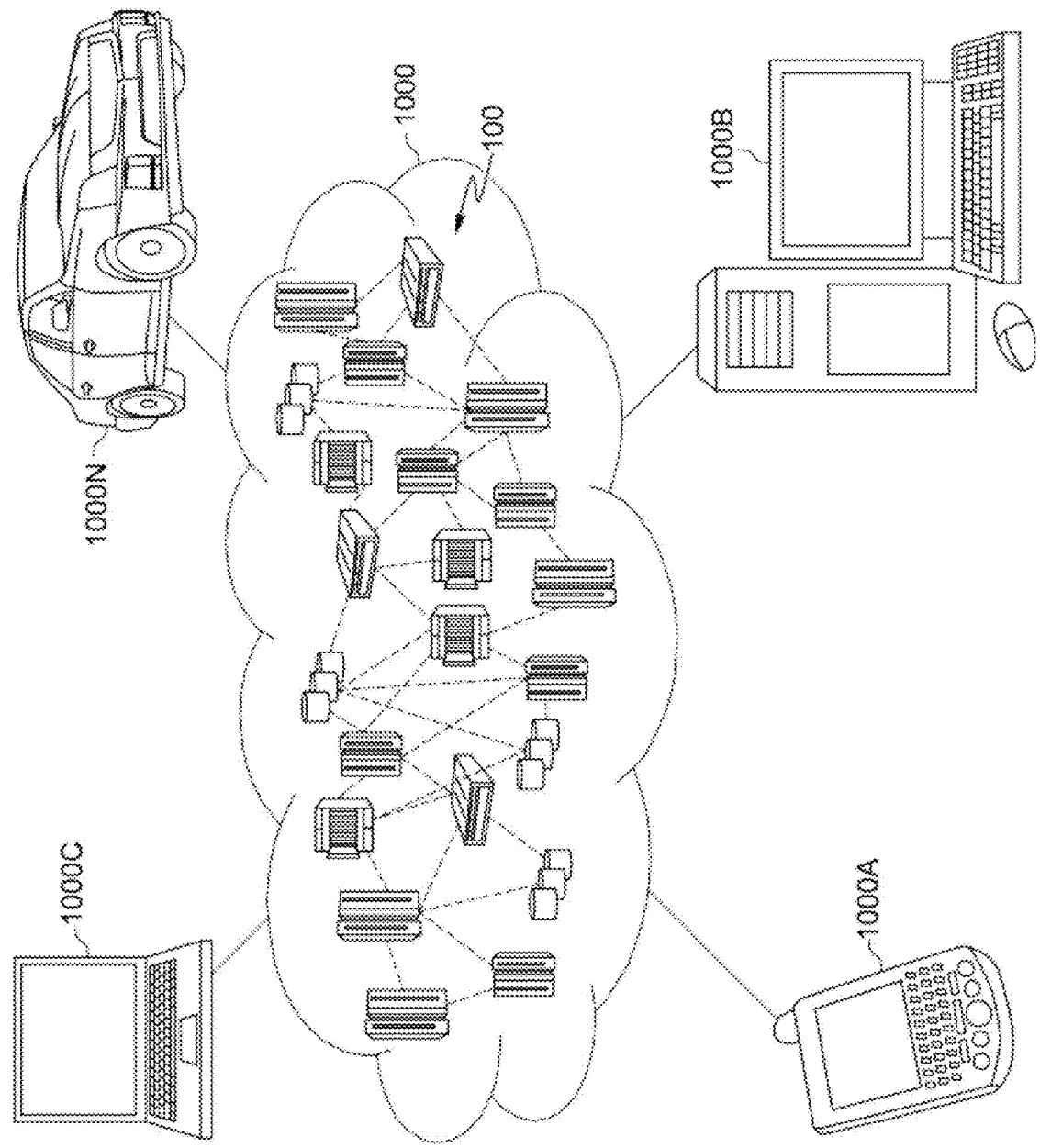
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
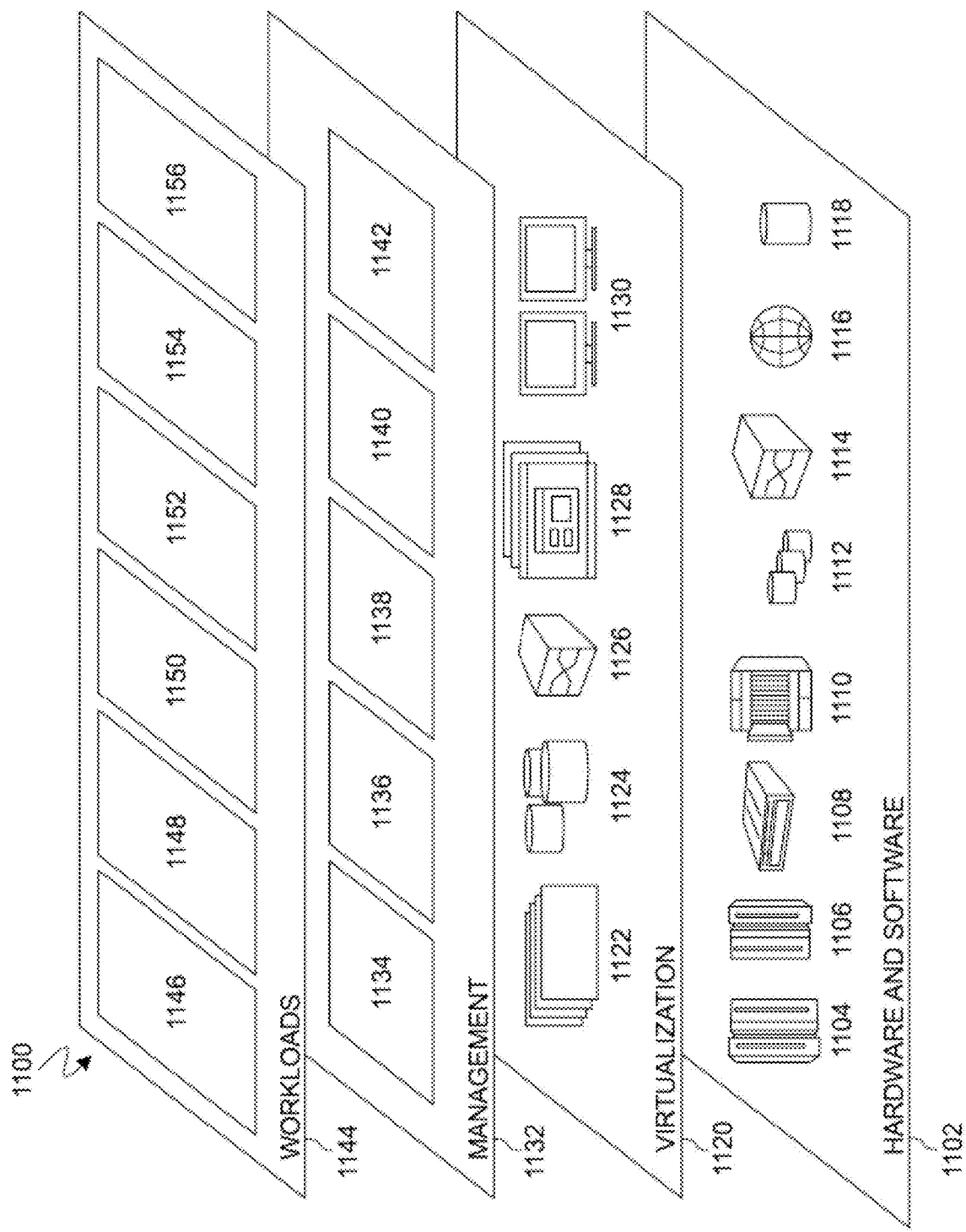
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and blockchain access 1156. A blockchain access program 110a, 110b provides a way to temporarily access blockchain data from varying levels of hierarchies at varying geographical locations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented process for granting geographic access to sensitive personal information (SPI) in blockchains across a public network, the computer-implemented process comprising:
   sharing blockchains among nodes in a local network A, wherein nodes in the local network A are trusted nodes for accessing a SPI repository stored in the local network A, wherein the SPI repository requires biometric features for access,
   wherein the local network A is within a first regional network, wherein the first regional network is within the public network, wherein the public network comprises a controller node and a second regional network in a different geography than the first regional network, wherein the controller node comprises a control blockchain and a hierarchy grouping, wherein the controller node manages the blockchains in the local network A and controls access to the blockchains, wherein the hierarchy grouping comprises a list of nodes from each local network within each of the first regional network and the second regional network, wherein the second regional network comprises a local network B,
   wherein the control blockchain comprises a list of complexity pairs between a hierarchy level of the hierarchy grouping and a public network level and manages a conversion when a blockchain is shared from a miner node of the local network A with a miner node of the local network B;
   reading, by a node 2 of the local network B, a first SPI blockchain of the SPI repository of a node 1 of the local network A, in response to the node 1 notifying the controller node to share the first SPI blockchain for a limited period of time, based on approved biometric features for access to the first SPI blockchain;
   creating a new block to a temporary second SPI blockchain in the node 2 based on the first SPI blockchain and additional SPI from node 2;
   sharing the new block on the temporary second SPI blockchain in the node 2 with node 1 for the limited period of time; and
   sending instructions to the node 1 to create a new block in a node 1 blockchain based on the new block.

2. The computer-implemented process of claim 1, wherein the node 1 resides on a level of hierarchy that is different from the control blockchain.

3. The computer-implemented process of claim 1, wherein the node 1 and the node 2 reside on the same level of hierarchy.

4. The computer-implemented process of claim 1, wherein the node 1 and the node 2 each reside in a separate regional blockchain network.

5. The computer-implemented process of claim 1, wherein the control blockchain, the node 1 and the node 2 each have a plurality of miners to read and write to a plurality of blockchains.

6. A computer system for granting geographic access to personal sensitive information (SPI) in blockchains across a public network, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system performs a process comprising:
   sharing blockchains among nodes in a local network A, wherein nodes in the local network A are trusted nodes for accessing a SPI repository stored in the local network A, wherein the SPI repository requires biometric features for access,
   wherein the local network A is within a first regional network, wherein the first regional network is within the public network, wherein the public network comprises a controller node and a second regional network in a different geography than the first regional network, wherein the controller node comprises a control blockchain and a hierarchy grouping, wherein the controller node manages the blockchains in the local network A and controls access to the blockchains, wherein the hierarchy grouping comprises a list of nodes from each local network within each of the first regional network and the second regional network, wherein the second regional network comprises a local network B, wherein the control blockchain comprises a list of complexity pairs between a hierarchy level of the hierarchy grouping and a public network level and manages a conversion when a blockchain is shared from a miner node of the local network A with a miner node of the local network B;

reading, by a node 2 of the local network B, a first SPI blockchain of the SPI repository of a node 1 of the local network A, in response to the node 1 notifying the controller node to share the first SPI blockchain for a limited period of time, based on approved biometric features for access to the first SPI blockchain;

creating a new block to a temporary second SPI blockchain in the node 2 based on the first SPI blockchain and additional SPI from node 2;

sharing the new block on the temporary second SPI blockchain in the node 2 with node 1 for the limited period of time; and sending instructions to the node 1 to create a new block in a node 1 blockchain based on the new block.

7. The computer system of claim 6, wherein the node 1 resides on a level of hierarchy that is different from the control blockchain.

8. The computer system of claim 6, wherein the node 1 and the node 2 reside on the same level of hierarchy.

9. The computer system of claim 6, wherein the node 1 and the node 2 each reside in a separate regional blockchain network.

10. The computer system of claim 6, wherein the control blockchain, wherein the control blockchain, the node 1 and the node 2 each have a plurality of miners to read and write to a plurality of blockchains.

11. A computer program product for granting geographic access to personal sensitive information (SPI) in blockchains across a public network, comprising:

one or more non-transitory computer-readable tangible storage media and program instructions stored on at least one of the one or more non-transitory computer-readable tangible storage media, the program instructions executable by a processor to cause the processor to perform a process comprising:

sharing blockchains among nodes in a local network A, wherein nodes in the local network A are trusted nodes for accessing a SPI repository stored in the local network A, wherein the SPI repository requires biometric features for access, wherein the local network A is within a first regional network, wherein the first regional network is within the public network, wherein the public network comprises a controller node and a second regional network in a different geography than the first regional network, wherein the controller node comprises a control blockchain and a hierarchy grouping, wherein the controller node manages the blockchains in the local network A and controls access to the blockchains, wherein the hierarchy grouping comprises a list of nodes from each local network within each of the first regional network and the second regional network, wherein the second regional network comprises a local network B, wherein the control blockchain comprises a list of complexity pairs between a hierarchy level of the hierarchy grouping and a public network level and manages a conversion when a blockchain is shared from a miner node of the local network A with a miner node of the local network B;

reading, by a node 2 of the local network B, a first SPI blockchain of the SPI repository of a node 1 of the local network A, in response to the node 1 notifying the controller node to share the first SPI blockchain for a limited period of time, based on approved biometric features for access to the first SPI blockchain;

creating a new block to a temporary second SPI blockchain in the node 2 based on the first SPI blockchain and additional SPI from node 2;

sharing the new block on the temporary second SPI blockchain in the node 2 with node 1 for the limited period of time; and sending instructions to the node 1 to create a new block in a node 1 blockchain based on the new block.

12. The computer program product of claim 11, wherein the node 1 resides on a level of hierarchy that is different from the control blockchain.

13. The computer program product of claim 11, wherein the node 1 and the node 2 reside on the same level of hierarchy.

14. The computer program product of claim 11, wherein the node 1 and the node 2 each reside in a separate regional blockchain network.

15. The computer system of claim 6, wherein the control blockchain, wherein the control blockchain, the node 1 and the node 2 each have a plurality of miners to read and write to a plurality of blockchains.

* * * * *